(12) United States Patent
Dalferth et al.

(10) Patent No.: US 6,216,434 B1
(45) Date of Patent: Apr. 17, 2001

(54) CHAIN JOINT

(75) Inventors: Hans Dalferth; Hans Bauer, both of Aalen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/367,565

(22) PCT Filed: Mar. 10, 1997

(86) PCT No.: PCT/DE97/00514

§ 371 Date: Aug. 17, 1999

§ 102(e) Date: Aug. 17, 1999

(87) PCT Pub. No.: WO98/40646

PCT Pub. Date: Sep. 17, 1998

(51) Int. Cl.[7] ............................. F16G 13/06; F16G 15/04
(52) U.S. Cl. ..................................... 59/85; 59/84
(58) Field of Search .................... 59/84, 85, 90, 59/86

(56) References Cited

U.S. PATENT DOCUMENTS 2,819,586 * 1/1958 St. Pierre ................... 59/85
4,505,103 * 3/1985 Dalferth et al. .............. 59/85

FOREIGN PATENT DOCUMENTS

| 3207629 | 9/1983 | (DE) . | |
|---|---|---|---|
| 3710047 | * 10/1988 | (DE) | ................. 59/85 |
| 3916-284 | * 11/1990 | (DE) | ................. 59/85 |
| 4333261 | 10/1994 | (DE) . | |

* cited by examiner

Primary Examiner—David Jones
(74) Attorney, Agent, or Firm—Mark P. Stone

(57) ABSTRACT

In a chain lock with essentially U-shaped lock parts (1, 2), each lock part has an inner limb (4) and an outer limb (3) which are connected to each other by a yoke. The outer and inner limbs (3, 4) are connected to each other in a closed position of the lock by three pairs of holding teeth (5, 8; 6, 9; 7, 10). For increasing the strength of the lock, the holding teeth (6, 9) of the central pairs of holding teeth, and the holding teeth (5, 8) of the pairs of holding teeth arranged in the region of the ends of the inner limbs (4), have a greater height (H) than the holding teeth (7, 10) of the other pairs of holding teeth. All holding teeth (5–10) support each other only over a central supporting zone which is limited in its height.

17 Claims, 1 Drawing Sheet

CHAIN JOINT

BACKGROUND OF THE INVENTION

The invention relates to a chain lock for link chains, having two essentially U-shaped lock parts which are releasably connected to one another and each have an inner limb and an outer limb which is connected to the latter via a yoke, the mutually facing sides of the inner and outer limbs being connected to one another in each case by three pairs of holding teeth in the closed position of the lock and a supporting and locking element for the lock parts being arranged between the mutually facing sides of the inner limbs in the region of the holding teeth of the central pairs of holding teeth which are designed to be stronger than the rest of the holding teeth.

A chain lock of the above type is known from DE 32 07 629 C2 with regard to its basic construction. The known chain lock is distinguished by a favourable distribution of the forces to be transmitted over the different pairs of holding teeth. Regardless of its advantageous design, the strength values which can be achieved with the known lock are still appreciably lower than the strength values exhibited by the links of the chain strands to be connected. Various approaches have been tried in the attempt to approximate the strength values of the lock to the strength values of chain links of the same quality category. One of the improvement possibilities is known from DE 43 33 261 C1; it consists in plastically deforming the region of the transition between the tooth flanks and the tooth interstices of the lock parts with the aid of a pressing or percussion tool in order, in this way, largely to compensate critical tensile direct stresses, occurring from the outset in the region mentioned, by means of compression stresses for the purpose of increasing dynamic strength.

SUMMARY OF THE INVENTION

The invention is based on the object of further increasing the strength of the generic chain lock by suitable measures in the sense of optimization in order to adapt the service lives of the lock and the chains to one another to an even greater extent than previously and thus, in particular, to meet the demands of mining for a reduction in the frequency of exchanging chain locks in drive chains subject to high loads under difficult conditions.

The object set is achieved by the fact that the holding teeth of the central pairs of holding teeth and the holding teeth of the pairs of holding teeth arranged in the region of the ends of the inner limbs have a greater height than the holding teeth of the pairs of holding teeth arranged in the region of the ends of the outer limbs, and that, between the flanks of the respective holding teeth of each pair of holding teeth engaged with one another, cavities are provided on both sides of a central supporting zone which extends at a maximum over a third of the height of the holding teeth and serves to transmit tensile forces.

It is achieved by the height ratios proposed that wear of the outer limbs of the lock results less rapidly than previously in weakening of the lock strength. The design of the contact conditions between the flanks of the holding teeth brings about a more favourable stress distribution within the lock, particularly in the case of heavy loads.

BRIEF DESCRIPTION OF THE DRAWINGS

Further details and features of the invention emerge from the subclaims and the following description of an embodiment illustrated in the attached drawing, in which:

In FIG. 1, 1 and 2 denote two essentially U-shaped lock parts of identical shape, each of which has an outer limb 3 and an inner limb 4. The outer limbs have three holding teeth 5, 6 and 7 and the inner limbs have three holding teeth 8, 9 and 10.

DESCRIPTION OF THE BEST MODES FOR CARRYING OUT THE INVENTION

Figures 1, 2:
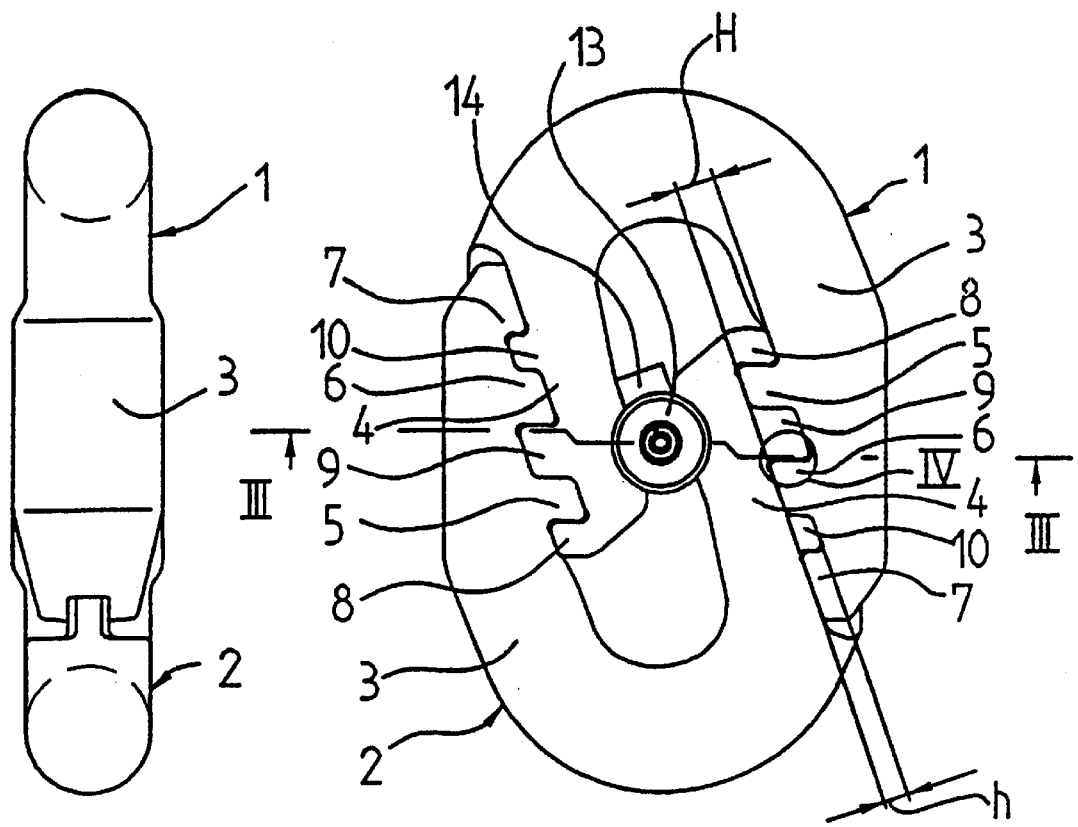
FIG. 1 shows the plan view of a chain lock.
FIG. 2 shows the side view of the chain lock according to FIG. 1.

The mutually facing surfaces of the inner limbs 4 are provided with catch recesses 11 in which spreading elements 12 designed as spring rings can engage, and by means of which a cylindrical supporting element 13 is held in the locking position. While the supporting element 13 is being moved into its locking position, the spreading elements 12 can be inserted into the interior of grooves of the supporting element 13. 14 is a device which secures the supporting element against rotation.

For the expedient distribution of the forces to be transmitted by the chain lock over the outer and inner limbs 3, 4, the height H of the holding teeth 5, 6, 8, 9 is greater than the height h of the holding teeth 7, 10.

Figure 3:
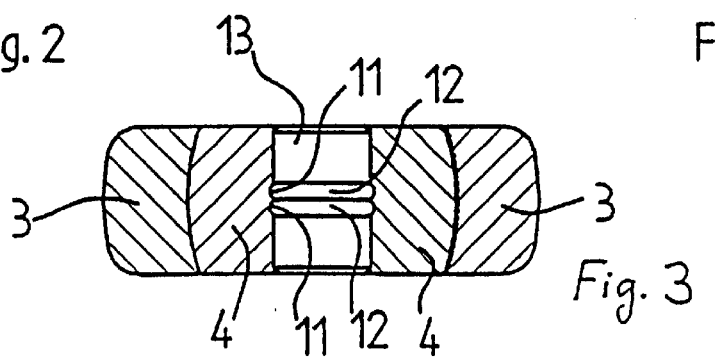
FIG. 3 shows a section along the line III—III in FIG. 1.

As can be seen from FIG. 3, the surfaces of the outer limbs 3 facing the inner limbs 4 are of concave design and the surfaces of the inner limbs 4 facing the outer limbs 3 are of convex design.

Figure 4:
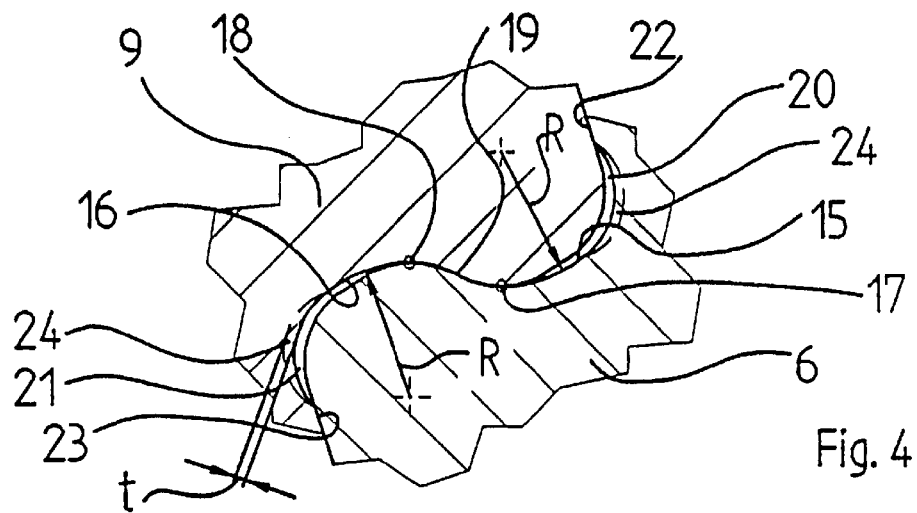
FIG. 4 shows, on an enlarged scale, the contact conditions of two tooth flanks in the region of the circle IV in FIG. 1.

The contact conditions between the holding teeth 6 and 9 are illustrated in FIG. 4. It can be seen that the tooth flanks 15, 16 rest against one another only along a supporting zone 19 located between the small circles 17, 18 drawn in FIG. 4. Cavities 20, 21 are arranged on both sides of the supporting zone 19. The design of the tooth flanks 15, 16 described ensures that tensile forces introduced into the chain lock are transmitted at a precisely defined favourable point. A row of depressions 24, indicated by dashed lines and overlapping slightly at the sides, is arranged in each case in the region of the transitions of the tooth flanks 15, 16 to the respective tooth root 22 or 23.

The depressions 24 are produced by pressing a tool, which has a tip designed as a pressing punch, into the tooth root. Through the plastic deformation of the tooth root in the region of the depressions 24, there is a constant build-up of compressive stresses. When the chain lock is subjected to loading, the tensile direct stresses occurring due to the action of external forces must first overcome these compressive stresses before they can reach a level which can lead to harmful crack formation. A considerable increase in the dynamic strength of the chain lock is achieved through the plastic deformation of the tooth root.

The depressions 24 preferably have the negative shape of a section of an ellipsoid whose semi-axis may be the same in the case of a spherical tool. In addition, however, pyramidal, frustopyramidal, conical or frustoconical pressing tools may also be used to form the depressions 24. The depth t of the indentations formed by the depressions 24 should be at least 2% and at most 20% of the radius R in the region of the transition from the tooth flanks to the tooth root, and the smallest distance between the centres of adjacent depressions should be in the order of magnitude of 5 to 15% of this radius R.

All the measures described, namely the coordinated height between the holding teeth 5, 6, 8, 9, on the one hand, and the holding teeth 7, 10, on the other hand, the targeted transmission of tensile forces along limited central regions of the holding teeth 5 to 10 and the surface reinforcement in the region of the transition from the flanks of the holding teeth 5 to 10 to the tooth root, lead to a significant increase in the strength of the chain lock, in the sense of optimization, whilst simultaneously reducing the scatter of the respective strength values.

What is claimed is:

1. Chain lock for link chains, said chain lock having two essentially U-shaped lock parts which are releasably connected to each other; each of said lock parts having an inner limb and an outer limb, said said inner and outer limbs having ends, said inner and outer limbs having mutually facing sides; said inner and outer limbs of one of said lock parts being connected, respectively, to said outer and inner limbs of the other one of said lock parts in a closed position of the lock by three pairs of holding teeth arranged on said mutually facing sides of said respective inner and outer limbs of said lock parts, one said pair of holding teeth being arranged in a region at the end of each of said outer limbs, another said pair of holding teeth being arranged in a region at the end of each of said inner limbs, and a central pair of holding teeth being disposed between said pairs of holding teeth at said ends of said inner and outer limbs; and a supporting and locking element for the lock parts arranged between said inner limbs in a region of said holding teeth of said central pair; said holding teeth of said central pair (6,9) being stronger than the holding teeth of said other pairs, said holding teeth of said central pair having a greater height (H) than that of the holding teeth of said pair arranged at each end of said outer limbs; a central supporting zone (19) defined in a region at which flanks of the respective holding teeth of each said pair of holding teeth engage with each other, and at least cavity provided on each side of each said central supporting zone, said supporting zone extending over part. of the height of the holding teeth for transmitting longitudinal forces; characterized in that the holding teeth (5, 8) of said pair arranged at each end of the inner limbs (4) have a greater height (H) than the holding teeth (7, 10) of said pair arranged at each end of the outer limbs (3); and that each said central supporting zone (19) extends, at a maximum, over a third of the height of the holding teeth (5–10) of each said respective pair.

2. Chain lock according to claim 1, characterized in that each said central supporting zone (19) has a slightly S-shaped contour.

3. Chain lock according to claim 2, characterized in that the flanks (15, 16) of said holding teeth of each of said pairs of holding teeth are in contact only in the region of the central supporting zone (19) of each said pair of holding teeth.

4. Chain lock according to claim 2, characterized in that the sides of the outer limbs (3) facing the inner limbs (4) are concave, and the sides of the inner limbs (4) facing the outer limbs (3) are of convex design.

5. Chain lock according to claim 2, characterized in that all of the holding teeth (5–10) in a region of transition from said tooth flanks (15, 16) to a tooth interstice region of the inner and outer limbs (3, 4) are plastically deformed with the aid of a pressing tool with a spherical pressing head producing depressions (24) for the purpose of surface reinforcement, the depressions (24) laterally overlapping each other and having a radius which is 85 to 95% of a radius (R) of the flanks of the teeth in a tooth root region of each of the teeth.

6. Chain lock according to claim 2, characterized in that the sides of the outer limbs (3) facing the inner limbs (4) are convex, and the sides of the inner limbs (4) facing the outer limbs (3) are of concave design.

7. Chain lock according to claim 1, characterized in that the flanks (15, 16) of said holding teeth of each of said pairs of holding teeth are in contact only in the region of the central supporting zone (19) of each said pair of holding teeth.

8. Chain lock according to claim 7, characterized in that the sides of the outer limbs (3) facing the inner limbs (4) are concave, and the sides of the inner limbs (4) facing the outer limbs (3) are of convex design.

9. Chain lock according to claim 7, characterized in that all of the holding teeth (5–10) in a region of transition from said tooth flanks (15, 16) to a tooth interstice region of the inner and outer limbs (3, 4) are plastically deformed with the aid of a pressing tool with a spherical pressing head producing depressions (24) for the purpose of surface reinforcement, the depressions (24) laterally overlapping each other and having a radius which is 85 to 95% of a radius (R) of the flanks of the teeth in a tooth root region of each of the teeth.

10. Chain lock according to claim 7, characterized in that of the sides of the outer limbs (3) facing the inner limbs (4) are convex, and the sides of the inner limbs (4) facing the outer limbs (3) are of concave design.

11. Chain lock according to claim 1, characterized in that the sides of the outer limbs (3) facing the inner limbs (4) are concave, and the sides of the inner limbs (4) facing the outer limbs (3) are of convex design.

12. Chain lock according to claim 11, characterized in that all of the holding teeth (5–10) in a region of transition from said tooth flanks (15, 16) to a tooth interstice region of the inner and outer limbs (3, 4) are plastically deformed with the aid of a pressing tool with a spherical pressing head producing depressions (24) for the purpose of surface reinforcement, the depressions (24) laterally overlapping each other and having a radius which is 85 to 95% of a radius (R) of the flanks of the teeth in a tooth root region of each of the teeth.

13. Chain lock according to claim 1, characterized in that all of the holding teeth (5–10) in a region of transition from said tooth flanks (15, 16) to a tooth interstice region of the inner and outer limbs (3, 4) are plastically deformed with the aid of a pressing tool with a spherical pressing head producing depressions (24) for the purpose of surface reinforcement, the depressions (24) laterally overlapping each other and having a radius which is 85 to 95% of a radius (R) of the flanks of the teeth in a tooth root region of each of the teeth.

14. Chain lock according to claim 13, characterized in that the smallest distance between centers of the respective adjacent depressions (24) is about 5 to 15% of the tooth root radius (R).

15. Chain lock according to claim 13, characterized in that each of said depressions (24) has a depth (t) which is at least 2% and at most 20% of said radius (R) in said tooth root region.

16. Chain lock according to claim 14, characterized in that each of said depressions (24) has a depth (t) which is at least 2% and at most 20% of said radius (R) in said tooth root region.

17. Chain lock according to claim 1, characterized in that the sides of the outer limbs (3) facing the inner limbs (4) are convex, and the sides of the inner limbs (4) facing the outer limbs (3) are of concave design.

* * * * *

UNITED STATES PATENT AND TRADEMARK OFFICE
CERTIFICATE OF CORRECTION

PATENT NO. : 6,216,434 B1
DATED : April 17, 2001
INVENTOR(S) : Hans Dalferth et al.

It is certified that error appears in the above-identified patent and that said Letters Patent is hereby corrected as shown below:

Claim 1,
Line 4, delete "said" (first occurrence).
Line 26, before "cavity", insert -- one --.
Line 28, after "part", delete -- . --.

Signed and Sealed this

Twenty-fifth Day of December, 2001

Attest:

JAMES E. ROGAN
Attesting Officer
Director of the United States Patent and Trademark Office